US012155120B2

(12) United States Patent
Hwang et al.

(10) Patent No.: US 12,155,120 B2
(45) Date of Patent: Nov. 26, 2024

(54) ANTENNA ARRAY DEVICE

(71) Applicant: DELTA ELECTRONICS, INC., Taoyuan (TW)

(72) Inventors: Chieh-Tsao Hwang, Taoyuan (TW); Yen-Ting Chen, Taoyuan (TW); Siang-Rong Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/655,554

(22) Filed: Mar. 21, 2022

(65) Prior Publication Data

US 2023/0068213 A1 Mar. 2, 2023

(30) Foreign Application Priority Data

Sep. 1, 2021 (CN) ......................... 202111022962.3

(51) Int. Cl.

*H01Q 1/52* (2006.01)
*H01Q 21/06* (2006.01)
*H01Q 21/24* (2006.01)

(52) U.S. Cl.

CPC ........... *H01Q 1/523* (2013.01); *H01Q 21/065* (2013.01); *H01Q 21/24* (2013.01)

(58) Field of Classification Search

CPC .... H01Q 21/06; H01Q 21/061; H01Q 21/065; H01Q 21/24; H01Q 21/29; H01Q 21/293; H01Q 19/005; H01Q 1/521; H01Q 1/523; H01Q 5/378; H01Q 5/385; H01Q 5/392

See application file for complete search history.

(56) References Cited

U.S. PATENT DOCUMENTS

| | | | | |
|---|---|---|---|---|
| 5,955,994 A * | 9/1999 | Staker | H01Q 19/005 343/700 MS |
| 6,211,824 B1 * | 4/2001 | Holden | H01Q 9/0414 343/846 |
| 7,903,040 B2 * | 3/2011 | Gevorgian | H01Q 21/065 343/909 |
| 9,397,406 B2 | 7/2016 | Grange et al. | |
| 10,014,572 B2 * | 7/2018 | Tagi | H01Q 1/525 |

(Continued)

FOREIGN PATENT DOCUMENTS

| | | | |
|---|---|---|---|
| CN | 103762425 A | 4/2014 |
| CN | 104157982 A | 11/2014 |

(Continued)

OTHER PUBLICATIONS

B.Farooq et al., "Antenna design for advance wireless systems using metamaterial surfaces", 2016 13th International Bhurban Conference on Applied Sciences and Technology (IBCAST), Jan. 12-16, 2016, pp. 641-646.

(Continued)

*Primary Examiner* — Jason M Crawford
(74) *Attorney, Agent, or Firm* — CKC & Partners Co., LLC

(57) ABSTRACT

An antenna array device is provided, which includes a ground plate, a substrate, an antenna array, and multiple patch elements. The substrate is disposed on the ground plate. The antenna array is disposed on the substrate. And the multiple patch elements are disposed on the substrate and arranged around the antenna array, and the multiple patch elements are floating (not connected to the ground plate).

8 Claims, 5 Drawing Sheets

(56) References Cited

U.S. PATENT DOCUMENTS

| | | | | |
|---|---|---|---|---|
| 10,768,275 | B2 | 9/2020 | Kawaguchi et al. | |
| 11,121,461 | B2 * | 9/2021 | Sakai | H01Q 15/24 |
| 11,276,926 | B2 * | 3/2022 | Yun | H01Q 1/48 |
| 11,316,283 | B2 * | 4/2022 | Hwang | H01Q 9/0407 |
| 2004/0080455 | A1 | 4/2004 | Lee | |
| 2009/0153391 | A1 | 6/2009 | Migliaccio et al. | |
| 2016/0028161 | A1 * | 1/2016 | Kawaguchi | H01Q 15/008 343/700 MS |
| 2018/0090852 | A1 * | 3/2018 | Dufilie | H01Q 1/38 |
| 2019/0089060 | A1 * | 3/2019 | Hara | H01Q 21/065 |
| 2020/0161767 | A1 * | 5/2020 | Hara | H01Q 9/0414 |
| 2020/0194887 | A1 * | 6/2020 | Necsoiu | H01Q 3/2647 |
| 2020/0295454 | A1 * | 9/2020 | Yun | H01Q 15/006 |
| 2020/0303822 | A1 | 9/2020 | Yao et al. | |
| 2021/0028559 | A1 * | 1/2021 | Hwang | H01Q 15/0086 |
| 2021/0029821 | A1 * | 1/2021 | Hwang | H01Q 15/008 |
| 2021/0242605 | A1 * | 8/2021 | Uchimura | H01Q 15/006 |
| 2021/0328361 | A1 * | 10/2021 | Hiramatsu | H01Q 13/18 |
| 2022/0368034 | A1 * | 11/2022 | Hwang | H01Q 21/065 |
| 2022/0399634 | A1 * | 12/2022 | Woo | H04B 7/0617 |
| 2023/0068213 | A1 * | 3/2023 | Hwang | H01Q 1/523 |

FOREIGN PATENT DOCUMENTS

| | | | |
|---|---|---|---|
| CN | 108604736 | A | 9/2018 |
| CN | 112290234 | A | 1/2021 |
| CN | 112421241 | A | 2/2021 |
| CN | 113036454 | A | 6/2021 |
| JP | 2020053908 | A | 4/2020 |
| JP | 2021022915 | A | 2/2021 |
| TW | I718599 | B | 2/2021 |
| WO | 2017/175835 | A1 | 10/2017 |

OTHER PUBLICATIONS

Wilke Rale et al., "Multi-layer patch antenna array design for Ka-Band satellite communication," 2013 SBMO/IEEE MTT-S International Microwave & Optoelectronics Conference (IMOC), IEEE, Aug. 2013 (Aug. 4, 2013), pp. 1-4.

Aljuhani Abdurrahman H et al., "Ultra-Low Cost Ku-Band Dual-Polarized Transmit and Receive Phased-Arrays for SATCOM and Point-to-Point Applications with Bandwidths up to 750 MHZ," 2019 IEEE International Symposium on Phased Array System & Technology (PAST), IEEE, Oct. 15, 2019 (Oct. 15, 2019), pp. 8138-8143.

* cited by examiner

ANTENNA ARRAY DEVICE

CROSS-REFERENCE TO RELATED APPLICATION

This application claims priority to China Application Serial Number 202111022962.3, filed Sep. 1, 2021, which is herein incorporated by reference in its entirety.

BACKGROUND

Field of Disclosure

The present disclosure relates to a technology of fifth generation new radio (5G NR). More particularly, the present disclosure relates to an antenna array device.

Description of Related Art

In the fifth generation new radio (5G NR) millimeter wave (mmWave) antenna array, a steering angle is a measure of evaluation achievable steering range of an antenna beam. However, because antenna arrays often generate surface waves when transmitting and receiving signals, a coupling effect occurs between antenna arrays, and their steering angles are often affected. Therefore, how to reduce the coupling effect between the antenna arrays to achieve a symmetrical steering field pattern and increase a gain of a larger steering angle is a problem that those skilled in the art are eager to solve.

SUMMARY

The disclosure provides an antenna array device, which comprises a ground plate, a substrate, an antenna array and a plurality of patch elements. The substrate is disposed on the ground plate. The antenna array is disposed on the substrate. And the plurality of patch elements are disposed on the substrate and arranged around the antenna array, and the plurality of patch elements are floating (not connected to the ground plate).

The disclosure provides an antenna array device, which comprises a ground plate, a substrate, a plurality of antenna arrays and a plurality of patch elements. The substrate is disposed on the ground plate. The plurality of antenna arrays is disposed on the substrate. And the plurality of patch elements are disposed on the substrate and arranged around each of the plurality of antenna arrays, and the plurality of patch elements are floating (not connected to the ground plate).

Based on the above, the antenna array device provided by the present disclosure can reduce coupling effect between the antenna arrays and increase gain at a larger steering angle by surrounding the multiple floating patch elements around the antenna array.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
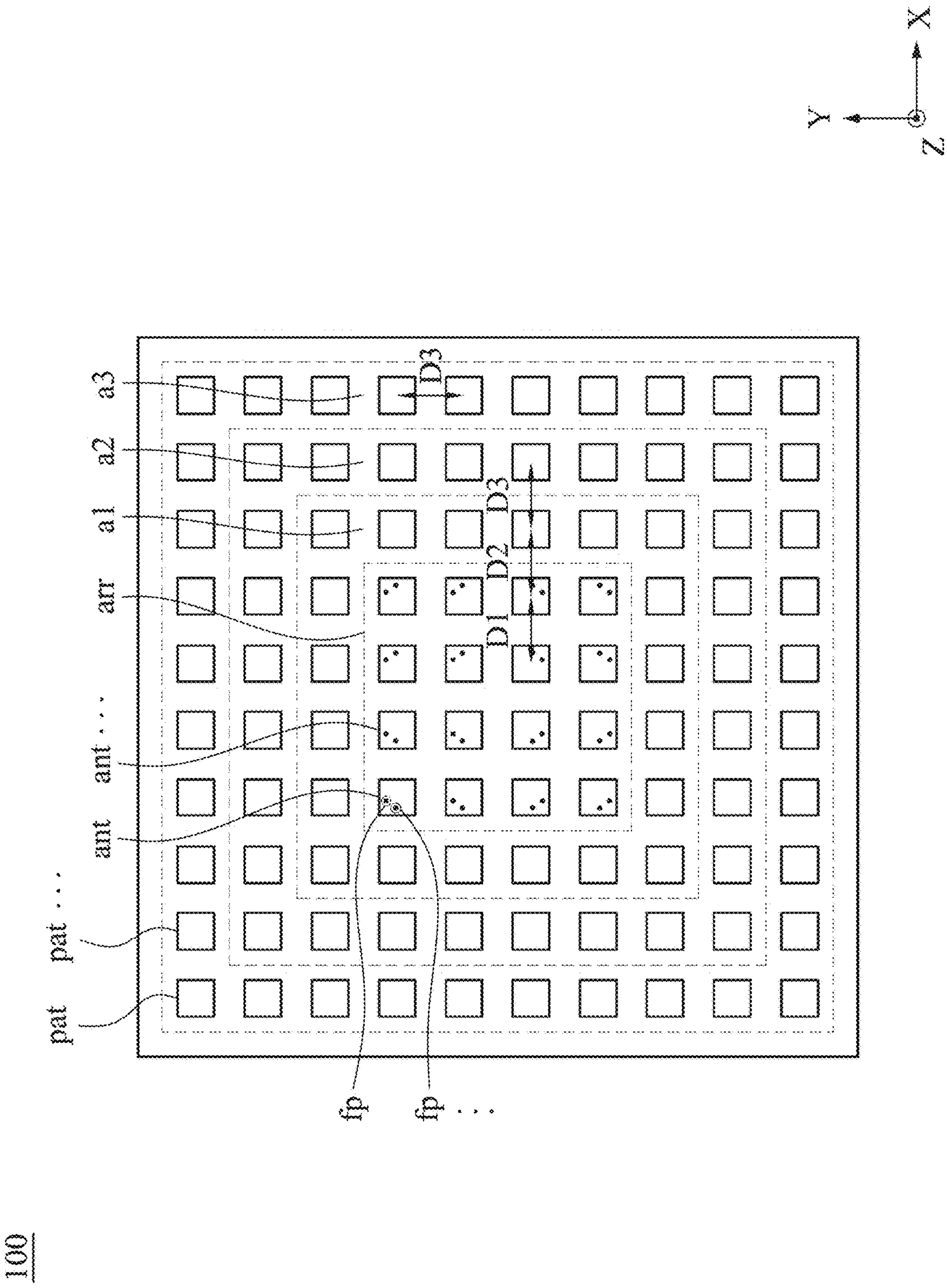
FIG. 1 illustrates a top view of an antenna array device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
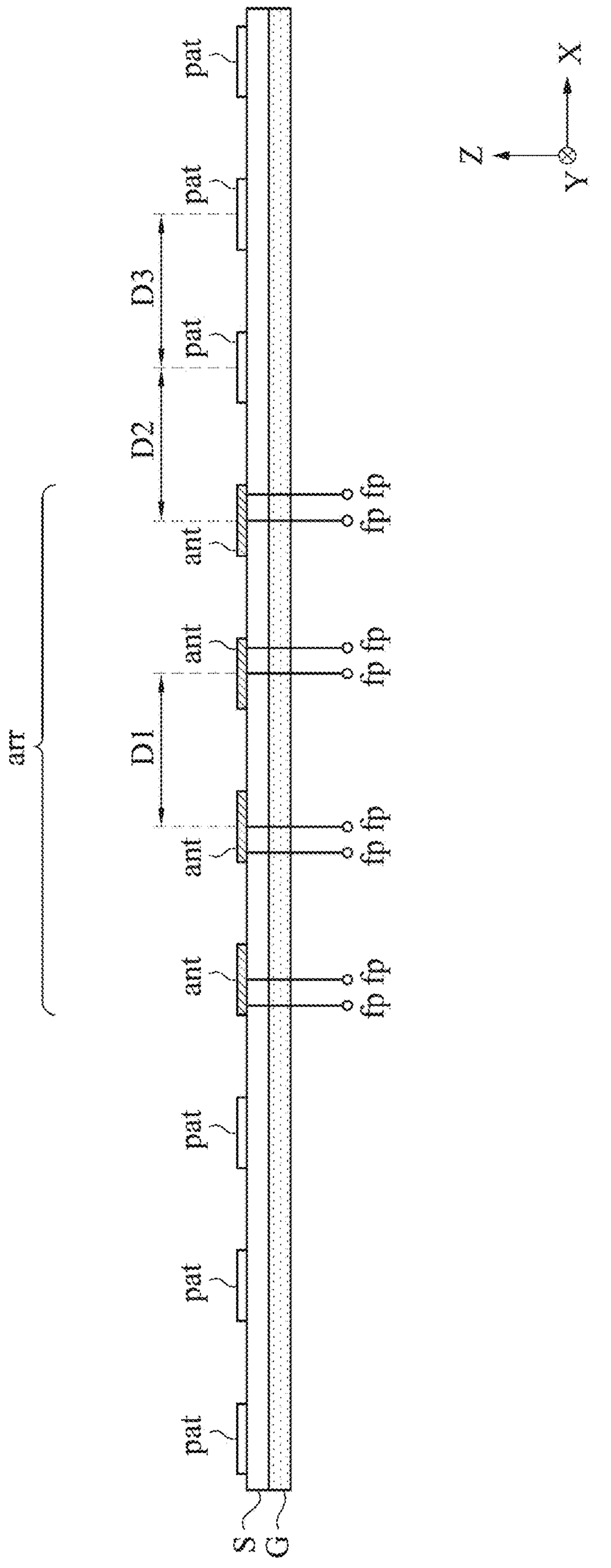
FIG. 2 illustrates a side view of the antenna array device according to an embodiment of the present disclosure.

FIG. 1 illustrates a top view of an antenna array device 100 according to an embodiment of the present disclosure, where FIG. 1 is a top view on a x-y plane. FIG. 2 illustrates a side view of the antenna array device 100 according to an embodiment of the present disclosure, where FIG. 2 is a side view on a x-z plane.

Referring to FIG. 1 and FIG. 2, the antenna array device 100 of the present disclosure includes a ground plate G, a substrate S, an antenna array arr, and multiple patch elements pat, where the substrate S is disposed on the ground plate G, the antenna array arr is disposed on the substrate S, the multiple patch elements pat are disposed on the substrate S and arranged around the antenna array arr, and these patch elements pat are not connected to the ground plate G (floating).

In some embodiments, the ground plate G can be made of metal materials such as copper foil. In some embodiments, the substrate S can be a printed circuit board (PCB) made of insulating material, where a material of the substrate S can be PTFE or FR4, which is commonly used to make PCB.

In some embodiments, the antenna array arr includes multiple antenna elements ant, and a distance D1 between adjacent two of these antenna elements ant can be a half wavelength of a center frequency of an operating frequency band of the antenna array arr, where these antenna elements ant and the multiple patch elements pat can be multiple metal sheets printed on the substrate S.

In some embodiments, a number of antenna elements ant can be 2 to the power of n, where n can be any positive integer. In a preferred embodiment, a number of antenna elements ant can be 16.

In some embodiments, the antenna element ant can be a single-polarization antenna element or a dual-polarization antenna element that is arbitrarily arranged in the antenna array, and there is no particular limitation on the antenna element ant. In a preferred embodiment, the antenna element ant can be the dual-polarization antenna element, and can be a patch antenna element, where the antenna element ant can have a first polarization direction and a second polarization direction. For example, the antenna element ant can have horizontal polarization in x direction and vertical polarization in y direction on the x-y plane.

In some embodiments, shape of the antenna element ant can be a metal sheet of any shape (e.g., a square, a rectangle, or a diamond, etc.), and there is no particular limitation on the antenna element ant. In a preferred embodiment, the shape of the antenna element ant can be a square.

In some embodiments, the antenna element ant can have two feed points fp, where the two feed points fp are used to feed signals to receive or transmit dual-polarization signals. For example, the two feed points fp of the antenna element ant are both connected to another side of substrate (not shown) parallel to the substrate S, and are used to feed signals to receive or transmit a horizontal polarization signal in the x direction and a vertical polarization signal in the y direction on the x-y plane.

In some embodiments, the feed points fp on the multiple antenna elements ant can be symmetrically disposed. For example, the antenna elements ant in first to second columns have the feed points fp close to the left, and the antenna elements ant in third to fourth columns have the feed points fp close to the right, so as to generate the horizontal polarization signal. And then, the antenna elements ant in a first to second rows have the feed points fp close to the upper part, and the antenna elements in a third to fourth rows have the feed points fp close to the lower part, so as to generate the vertical polarization signal.

In some embodiments, the multiple patch elements pat can be disposed on the substrate S from inside out, and are arranged along first, second and third surrounding areas a1-a3 around the antenna array arr, where shape of the first, second and third surrounding areas a1-a3 can be a hollow square. Furthermore, a minimum distance D2 between geometric centers of the patch elements pat and geometric centers of the multiple antenna elements ant can be more than or equal to a quarter wavelength of the center frequency of the operating frequency band of the antenna array arr, and be less than or equal to a three-quarter wavelength of the center frequency of the operating frequency band of the antenna array arr.

In detail, the multiple patch elements pat can be arranged in the shape of three hollow squares in the first, second and third surrounding areas a1-a3, and the minimum distance D2 is existed between the geometric centers of the patch elements pat in the first surrounding area a1 and the geometric centers of the antenna elements ant arranged at the outermost periphery in the antenna array arr. The minimum distance D2 can be more than or equal to the quarter wavelength of the center frequency of the operating frequency band of the antenna array arr, and be less than or equal to the three-quarter wavelength of the center frequency of the operating frequency band of the antenna array arr.

It should be noted that a number of the surrounding areas with the patch element pat can be any positive integer not less than 2, and there is no particular limitation on the number of the surrounding areas.

In some embodiments, shape of the patch element pat can also be a metal sheet with any shape (e.g., a square, a rectangle, or a diamond shape, etc.), and there is no particular limitation on the shape of the patch element pat. In a preferred embodiment, the shape of the patch element pat can be a square, and a surface area of the patch element pat can be equal to a surface area of the antenna element ant.

In some embodiments, a distance D3 between geometric centers of adjacent two of the multiple patch elements pat can be more than or equal to a quarter wavelength of the center frequency of the operating frequency band of the antenna array arr, and be less than or equal to the three-quarter wavelength of the center frequency of the operating frequency band of the antenna array arr. In a preferred embodiment, the distance D3 can be equal to the above-mentioned distance D1 and the above-mentioned minimum distance D2.

In detail, the distance D3 is existed between the geometric centers of the two adjacent patch elements pat in the first surrounding area a1. The distance D3 is also existed between the geometric centers of two adjacent patch elements pat in the second surrounding area a2. The distance D3 is also existed between the geometric centers of two adjacent patch elements pat in the third surrounding area a3. Furthermore, an another minimum distance equal to the distance D3 is existed between the geometric centers of the patch elements pat in the first surrounding area a1 and the geometric centers of the patch elements pat in the second surrounding area a2. The another minimum distance equal to the distance D3 is also existed between the geometric centers of the patch elements pat in the second surrounding area a2 and the geometric centers of the patch elements pat in the third surrounding area a3.

In some embodiments, the antenna array arr can resonate with the multiple patch elements pat, so as to increase radiation efficiency and antenna gain of the antenna array arr steering in a horizontal direction and increase radiation efficiency and antenna gain of the antenna array steering in a vertical direction.

In detail, when the antenna array arr transmits or receives signals, the antenna array arr can generate surface waves on the substrate S. The surface waves will affect the radiation efficiency and the antenna gain of the antenna array arr at a large steering angle in the horizontal direction, and also affect the radiation efficiency and antenna gain at the large steering angle in the vertical direction.

In order to prevent the above influence, the multiple patch elements pat arranged from the inside out and along the first, second and third surrounding areas a1-a3 can resonate with these surface waves, so as to greatly increase the radiation efficiency and antenna gain of the antenna array arr at the large steering angle in the horizontal direction and the vertical direction. Based on the above, the multiple patch elements pat arranged from the inside out and along the first, second and third surrounding areas a1-a3 can greatly increase the radiation efficiency and the antenna gain of the antenna array device 100 at the large steering angle.

Figure 3:
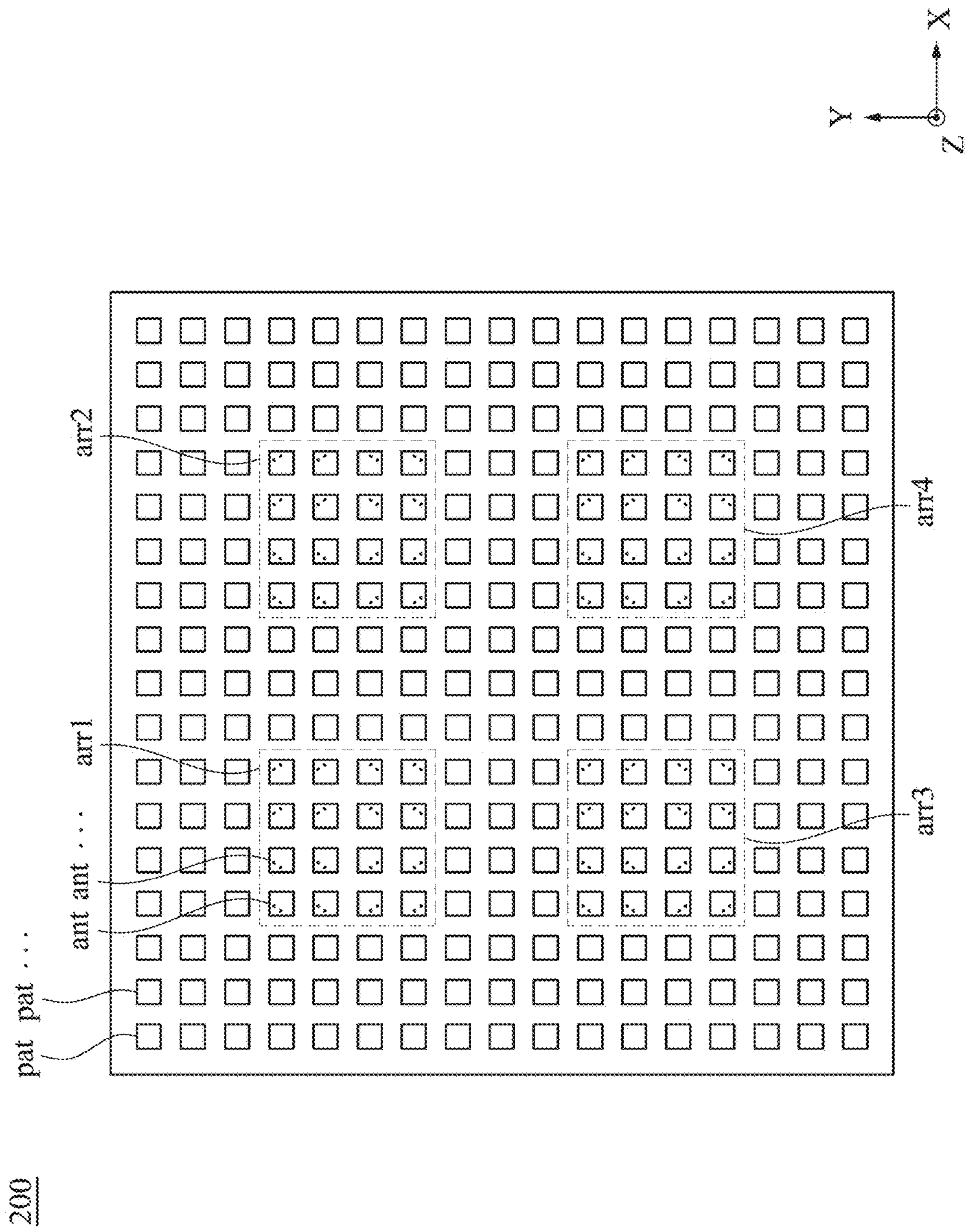
FIG. 3 illustrates a top view of an antenna array device according to another embodiment of the present disclosure.

FIG. 3 illustrates a top view of an antenna array device 200 according to another embodiment of the present disclosure. Referring to FIG. 3, the antenna array device 200 has a structure similar to the structure of the antenna array device 100 of FIG. 1. A difference between the two is only in the number of antenna arrays, where the antenna arrays arr1-arr4 and the patch elements pat surrounding the antenna arrays arr1-arr4 respectively have the same structure as the antenna array device 100. Therefore, only the difference are described here, and the rest of the similarities will not be repeated.

Firstly, the antenna array device 200 includes four antenna arrays arr1-arr4. In some embodiments, the number of antenna arrays in the antenna array device 200 can be any positive integer greater than 1, and there is no particular limitation on the number of antenna arrays. In a preferred embodiment, the number of antenna arrays in the antenna array device 200 can be four.

It should be noted that in addition to these patch elements pat around the antenna arrays arr1-arr4 can increase radiation efficiency and antenna gain of the antenna arrays arr1-arr4 at the large steering angle in the horizontal direction and the vertical direction, steering asymmetry caused by interference of the surface waves generated by the antenna arrays arr1-arr4 on the adjacent antenna arrays can also greatly be reduced.

In other words, the arrangement of the patch elements pat around the antenna arrays arr1-arr4 can greatly increase horizontal and vertical steering angles of the antenna arrays arr1-arr4 and isolation between the antenna arrays arr1-arr4.

Based on the above, by surrounding the multiple patch elements pat around the antenna arrays arr1-arr4, the radiation efficiency and the antenna gain of the antenna array device 200 at the large steering angle can be greatly increased, and the isolation between the antenna arrays arr1-arr4 in the antenna array device 200 is greatly increased.

Figure 4:
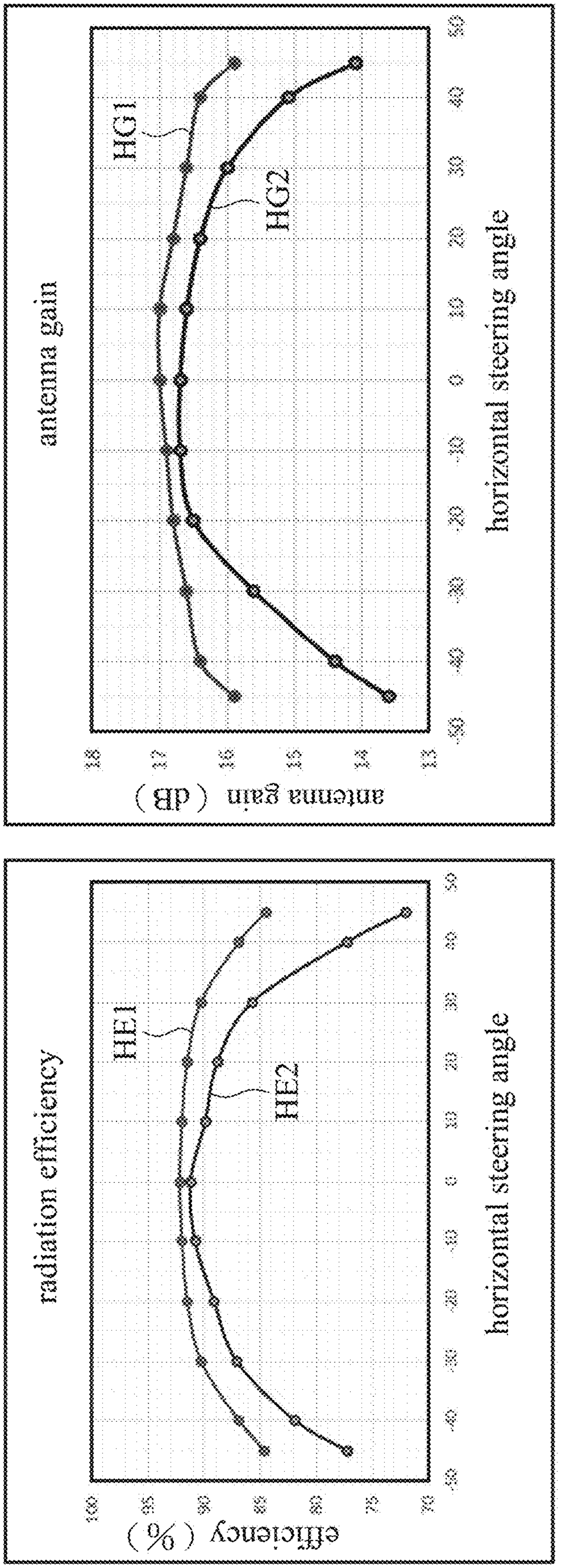
FIG. 4 illustrates a plot of radiation efficiency and antenna gain of horizontal polarization antenna array device in a horizontal direction steering according to another embodiment of the present disclosure.

The following description takes horizontal polarization as an example, and the effect of vertical polarization is also the same, and will not be repeated. FIG. 4 illustrates a plot of the radiation efficiency and the antenna gain of the horizontal polarization of the antenna array device 200 in the horizontal direction steering according to another embodiment of the present disclosure. Referring to FIG. 3 and FIG. 4, when the antenna arrays arr1-arr4 do not have the surrounding patch elements pat and are arranged close to each other, the antenna array arr4 has a radiation efficiency curve HE2 in the horizontal direction when the horizontal steering angle is −50 to 50 degrees. When the structure of the antenna array device 200 is adopted, the antenna array arr4 has a radiation efficiency curve HE1 in the horizontal direction when the horizontal steering angle is −50 to 50 degrees. It can be observed that when the horizontal steering angle is −50 to −30 degrees and 30 to 50 degrees, the antenna array device 200 can increase the radiation efficiency by 10% to 15% in the horizontal direction. At the same time, values of steering at the same positive and negative angles are more consistent. Furthermore, when the antenna arrays arr1-arr4 do not have the surrounding patch elements pat and are arranged close to each other, the antenna array arr4 has an antenna gain curve HG2 in the horizontal polarization when the horizontal steering angle is −50 to 50 degrees. When the structure of the antenna array device 200 is adopted, the antenna array arr4 has an antenna gain curve HG1 in the horizontal polarization when the horizontal steering angle is −50 to 50 degrees. It can be observed that when the horizontal steering angle is −50 to −30 degrees and 30 to 50 degrees, the antenna array device 200 can increase the antenna gain of 2 dB to 3 dB in the horizontal direction. At the same time, the values of steering of the antenna array device 200 at the same positive and negative angles are more consistent.

Figure 5:
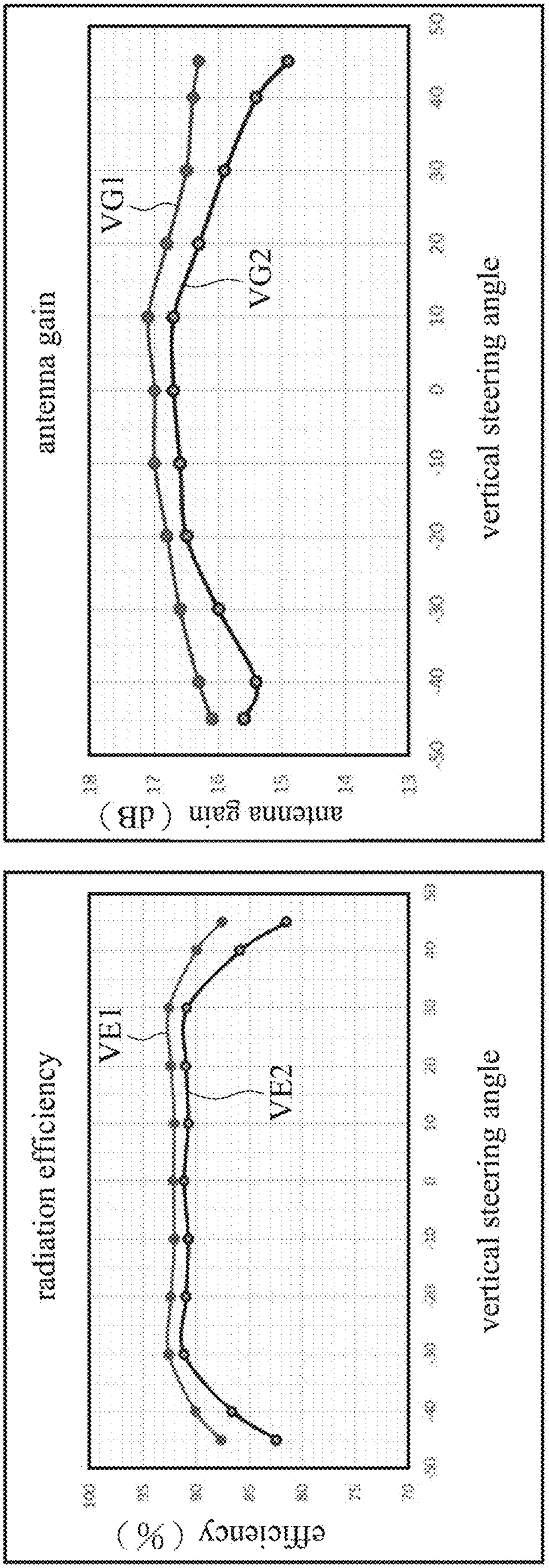
FIG. 5 illustrates a plot of radiation efficiency and antenna gain of horizontal polarization antenna array device in a vertical direction steering according to another embodiment of the present disclosure.

FIG. 5 illustrates a plot of the radiation efficiency and the antenna gain of the horizontal polarization of the antenna array device 200 in the vertical direction steering according to another embodiment of the present disclosure. Referring to FIG. 3 and FIG. 5, when the antenna arrays arr1-arr4 do not have the surrounding patch elements pat and are arranged close to each other, the antenna array arr4 has a radiation efficiency curve VE2 in the horizontal polarization when the vertical steering angle is −50 to 50 degrees. When the structure of the antenna array device 200 is adopted, the antenna array arr4 has a radiation efficiency curve VE1 in the horizontal polarization when the vertical steering angle is −50 to 50 degrees. It can be seen that when the vertical steering angle is −50 to −30 degrees and 30 to 50 degrees, the antenna array device 200 can increase the radiation efficiency by 5% to 10% in the vertical direction.

Furthermore, when the antenna arrays arr1-arr4 do not have the surrounding patch elements pat and are arranged close to each other, the antenna array arr4 has an antenna gain curve VG2 in the horizontal polarization when the steering angle in the vertical direction is −50 to 50 degrees. When the structure of the antenna array device 200 is adopted, the antenna array arr4 has an antenna gain curve VG1 in the horizontal polarization when the steering angle in the vertical direction is −50 to 50 degrees. It can be seen that when the vertical steering angle is −50 to −30 degrees and 30 to 50 degrees, the antenna array device 200 can increase the antenna gain by 0.2 dB to 1.5 dB in the vertical direction.

In summary, the antenna array device of the present disclosure can use the arrangement of the above-mentioned floating patch element, so as to greatly increase the radiation efficiency of the antenna array at a large steering angle and the antenna gain. In addition, the patch element can also greatly increase the isolation between the multiple antenna arrays.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna array device, comprising:
a ground plate;
a substrate, disposed on the ground plate;
an antenna array, disposed on the substrate, wherein the antenna array comprises a plurality of antenna elements; and
a plurality of patch elements, disposed on the substrate and arranged around the antenna array, and the plurality of patch elements are not connected to the ground plate, and there is no patch element between adjacent two antenna elements of the plurality of antenna elements;
wherein the plurality of patch elements are disposed on the substrate from inside out, and are arranged along at least two surrounding areas, and
a minimum distance between a geometric center of each of the plurality of patch elements arranged along an innermost surrounding area of the at least two surrounding areas and a geometric center of an adjacent antenna element of the antenna elements is more than or equal to a quarter wavelength of a center frequency of an operating frequency band of the antenna array, and is less than or equal to a three-quarter wavelength of the center frequency of the operating frequency band of the antenna array, and
a distance between two geometric centers of two adjacent patch elements of the plurality of patch elements is more than or equal to a quarter wavelength of a center frequency of an operating frequency band of the antenna array, and less than or equal to a three-quarter wavelength of the center frequency of the operating frequency band of the antenna array.

2. The antenna array device of claim 1, wherein
distances between adjacent two of the plurality of antenna elements are a half wavelength of the center frequency of the operating frequency band of the antenna array, wherein the plurality of antenna elements and the plurality of patch elements are metal sheets printed on the substrate.

3. The antenna array device of claim 1, wherein shape of the at least two surrounding areas is a hollow square.

4. The antenna array device of claim 1, wherein the antenna array resonates with the plurality of patch elements, so as to increase radiation efficiency and antenna gain of the antenna array steering in a horizontal direction and increase radiation efficiency and antenna gain of the antenna array steering in a vertical direction.

5. An antenna array device, comprising:

a ground plate;

a substrate, disposed on the ground plate;

a plurality of antenna arrays, disposed on the substrate, wherein the plurality of antenna arrays comprise a plurality of antenna elements; and a plurality of patch elements, disposed on the substrate and arranged around the antenna array, and the plurality of patch elements are not connected to the ground plate, and there is no patch element between adjacent two antenna elements of the plurality of antenna elements;

wherein the plurality of patch elements are disposed on the substrate from inside out with each of the plurality of antenna arrays as a center point, and are arranged along at least two surrounding areas around the each of the plurality of antenna arrays, and a minimum distance between a geometric centers of each of the plurality of patch elements arranged along an innermost surrounding area of the at least two surrounding areas and a geometric center of an adjacent antenna element of the antenna elements is more than or equal to a quarter wavelength of a center frequency of an operating frequency band of the antenna array, and is less than or equal to a three-quarter wavelength of the center frequency of the operating frequency band of the antenna array, and a distance between two geometric centers of two adjacent patch elements of the plurality of patch elements is more than or equal to a quarter wavelength of a center frequency of an operating frequency band of the antenna array, and less than or equal to a three-quarter wavelength of the center frequency of the operating frequency band of the antenna array.

6. The antenna array device of claim 5, wherein distances between adjacent two of the plurality of antenna elements are a half wavelength of the center frequency of the operating frequency band of the plurality of antenna arrays, wherein the plurality of antenna elements and the plurality of patch elements are metal sheets printed on the substrate.

7. The antenna array device of claim 5, wherein shape of the at least two surrounding areas is a hollow square.

8. The antenna array device of claim 5, wherein the each of the plurality of antenna arrays resonates with neighboring ones of the plurality of patch elements, so as to increase radiation efficiency and antenna gain of the plurality of antenna arrays steering in a horizontal direction, increase radiation efficiency and antenna gain of the plurality of antenna arrays steering in a vertical direction, and increase isolation between the plurality of antenna arrays.

* * * * *